P. WILNER.
LIQUID LEVEL.
APPLICATION FILED DEC. 4, 1916.
1,234,594.
Patented July 24, 1917.
2 SHEETS—SHEET 2.
Fig. 3
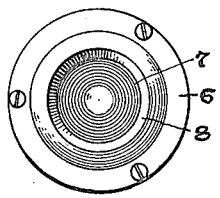
Fig. 4
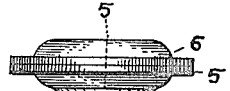
Fig. 9
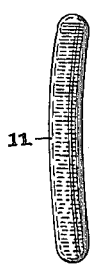
Fig. 7
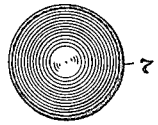
Fig. 8
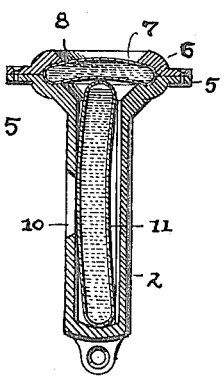
Fig. 5
Fig. 6
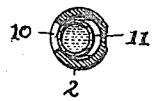
INVENTOR.
PHILLIP WILNER
BY *Fisher & Moser*
ATTORNEYS.

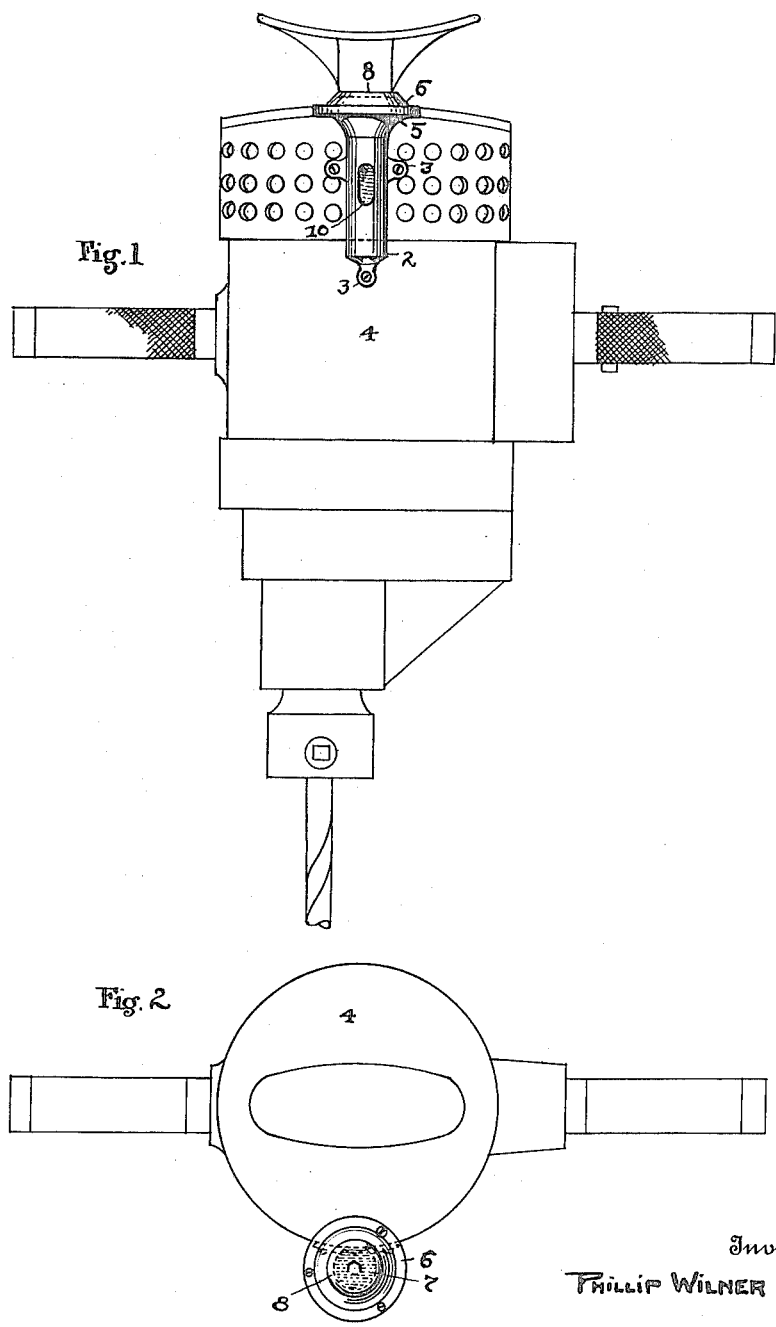

UNITED STATES PATENT OFFICE.

PHILLIP WILNER, OF CLEVELAND, OHIO.

LIQUID-LEVEL.

1,234,594.  Specification of Letters Patent.  Patented July 24, 1917.

Application filed December 4, 1916. Serial No. 134,795.

*To all whom it may concern:*

Be it known that I, PHILLIP WILNER, a subject of the Czar of Russia, residing at Cleveland, in the county of Cuyahoga and State of Ohio, have invented certain new and useful Improvements in Liquid-Levels, of which the following is a specification.

This invention relates to liquid levels and comprises the improvements herein shown and described and more particularly pointed out in the claims.

The object of the invention is to provide a liquid level in the form of a transparent disk of spherical concavo-convexity having a sealed chamber approximately full of a suitable liquid exclusive of a relatively small air space or bubble. A liquid level of this kind is of especial utility when incased and affixed in a horizontal position to determine an absolutely true and perpendicular position of an object to which the level is applied or attached. For example, the device is especially adapted for use with portable power drills to guide the operator in boring an opening with the tool in a perpendicular position, the liquid level being applied to the upper end of the tool where it may be seen to the best advantage with the convex face of the level disposed horizontally and its axis parallel to the axis of the tool while the drill is more or less hidden at the lower end of the tool.

A further object of the invention is to provide a suitable mounting having a round sight opening for the disk level, and to furnish a second liquid level disposed in the form of a curved tube in the line of axis of the disk level.

In the accompanying drawings, Figure 1 is a side elevation of a portable power drill showing my improved liquid level mounted thereon, and Fig. 2 is a plan view of the parts shown in Fig. 1. Fig. 3 is an enlarged plan view of one form of my improved liquid level, and Fig. 4 is a side elevation of the device shown in Fig. 3. Fig. 5 is a sectional view on line 5—5, Fig. 4, and Fig. 6 is a cross section of the casing and tube therein on the line of the sight opening. Figs. 7 and 8 are plan and edge views, respectively, of the concavo-convex liquid-containing disk. Fig. 9 is a side elevation of the tubular liquid level which is incased within the hollow stem portion of the mounting or casing shown in Fig. 5.

The device shown in the drawing consists of a round tubular metallic body or casing 2 having a set of ears 3 by means of which the body may be affixed to another object, for example, to the side walls of a portable drill 4. Body 2 is provided with an enlarged recessed head 5 which may be of circular outline with its center coincident with the longitudinal axis of body 2, and a removable cap 6 of ring shape is adapted to be screwed or otherwise fastened to the flat end face of head 5. Both said head and cap are constructed in their meeting faces with suitably formed recesses to hold a separate glass disk 7 firmly in place therein, and this disk is preferably of circular outline and of spherical concavo-convex formation with the convex surface exposed through and centrally opposite the round sight opening 8 in cap 6. A suitable liquid is confined within the disk in sufficient quantity to leave a small air space or so-called bubble therein, whereby a true level may be determined by the proper setting of the instrument and as indicated by the exact central location of the bubble relatively to the round border of the sight opening 8.

Body 2 is also provided with a sight opening 10 at one side thereof, and an elongated curved glass tube 11 approximately full of liquid is confined within the body opposite opening 10 to provide an indicator or guide in determining a true level when the object to which it is applied sustains a horizontal position instead of a perpendicular or vertical position. The upper end of tube 11 is engaged by the lower surface of disk 7 and the cap 6 holds both the disk and tube in place and both may be removed from the body when the cap is removed.

What I claim is:

1. In a liquid level for drilling tools, a transparent hollow disk having integral walls of spherical concavo-convex formation, the said hollow disk being filled substantially full of liquid to provide a relatively small air bubble therein, in combination with a casing having a round sight opening centrally disposed opposite the convex portion of said disk, a drilling tool, and means to affix said casing to said drilling tool with the axis of the disk parallel to the axis of the tool.

2. In combination, a round hollow disk of concavo-convex formation having transparent walls of substantially uniform thickness and containing a predetermined amount of liquid to provide an air bubble within the disk, a tubular liquid level, a holding body having a round sight opening for said disk and an opening at one side for said tubular level, a drilling tool, and means to secure said holding body to said tool with the axis of both the disk and tubular level parallel with the axis of the tool.

3. In a liquid level, a casing having a round sight opening in one end and a separate sight opening in the side thereof, in combination with a parti-spherical hollow transparent liquid-containing disk centrally disposed within said casing opposite said end opening, and a transparent liquid-containing tube located within said casing opposite said side opening.

4. In a liquid level, a body having a longitudinal chamber centrally and a sight opening at one side thereof and provided with a removable end cap having a round sight opening, in combination with a transparent liquid-containing disk and a transparent liquid-containing tube confined within said chamber and cap opposite said sight openings.

5. In a liquid level, a tubular body having a sight opening at one side and an enlarged recessed end, and a removable cap for said end having a central circular opening, in combination with a curved tubular liquid level mounted within said body opposite its sight opening and a disk-shaped liquid level of parti-spherical formation mounted within said cap centrally opposite its circular opening.

Signed at Cleveland, in the county of Cuyahoga, and State of Ohio, this 25th day of November, 1916.

PHILLIP WILNER.